US010817936B2

(12) United States Patent
Hummer

(10) Patent No.: US 10,817,936 B2
(45) Date of Patent: Oct. 27, 2020

(54) FRACTIONALIZED INTEREST RATE SWAPS

(71) Applicant: Melanie Susan Hummer, Chicago, IL (US)

(72) Inventor: Melanie Susan Hummer, Chicago, IL (US)

( * ) Notice: Subject to any disclaimer, the term of this patent is extended or adjusted under 35 U.S.C. 154(b) by 0 days.

(21) Appl. No.: 16/785,420

(22) Filed: Feb. 7, 2020

(65) Prior Publication Data

US 2020/0258148 A1    Aug. 13, 2020

Related U.S. Application Data

(60) Provisional application No. 62/802,269, filed on Feb. 7, 2019.

(51) Int. Cl.
*G06Q 40/02* (2012.01)
*G06Q 40/06* (2012.01)
(Continued)

(52) U.S. Cl.
CPC ....... *G06Q 40/025* (2013.01); *G06Q 20/0658* (2013.01); *G06Q 20/3672* (2013.01); *G06Q 40/06* (2013.01)

(58) Field of Classification Search
CPC ............. G06Q 40/025; G06Q 20/0658; G06Q 20/3672; G06Q 40/06
See application file for complete search history.

(56) References Cited

U.S. PATENT DOCUMENTS 6,304,858 B1    10/2001    Mosler
7,706,990 B2 *    4/2010    Herzig ................. G06Q 20/102
                                                          702/62

(Continued)

FOREIGN PATENT DOCUMENTS

AU    2017100426 A4    6/2017
EP    3432240 A1    1/2019
(Continued)

OTHER PUBLICATIONS

Streetwise professor: A pitch perfect illustration of blockchain hype (2016). . Chatham: Newstex. Retrieved from https://dialog.proquest.com/professional/docview/1828070318?accountid=131444 on Aug. 21, 2020 (Year: 2016).*

(Continued)

*Primary Examiner* — Kito R Robinson
(74) *Attorney, Agent, or Firm* — Sheppard Mullin Richter & Hampton LLP

(57) ABSTRACT

Systems and methods for implementing and managing one-to-many fractionalized interest rate swaps between a borrower and one or more investors via a distributed ledger-based platform are described herein. The distributed ledger-based platform may be configured to generate and provide user interfaces through which a user may provide a set of input variables for a fractionalized interest rate swap. Based on the set of input variables, the platform may automatically configure a customizable smart contract configured to initialize the fractionalized interest rate swap between at least one borrower and one investor. At the maturity date of the fractionalized interest rate swap, the smart contract may be configured to calculate amounts to be allocated to the borrower and investor, automatically release the amounts from the escrow account associated with the smart contract, and settle the contract by transferring the corresponding amounts to accounts of the borrower and investor.

18 Claims, 4 Drawing Sheets

(51) Int. Cl.
*G06Q 20/06* (2012.01)
*G06Q 20/36* (2012.01)

(56) References Cited

U.S. PATENT DOCUMENTS

| | | | | |
|---|---|---|---|---|
| 7,742,897 | B2* | 6/2010 | Herzig | H02J 3/381 |
| | | | | 702/182 |
| 7,809,621 | B2* | 10/2010 | Herzig | G06Q 50/06 |
| | | | | 705/35 |
| 7,895,103 | B1* | 2/2011 | Hendrix | G06Q 40/04 |
| | | | | 705/35 |
| 8,333,653 | B2* | 12/2012 | Nyman | G07F 17/3251 |
| | | | | 463/25 |
| 8,751,339 | B2 | 6/2014 | Pinkava | |
| 9,317,995 | B2* | 4/2016 | Nyman | G07F 17/32 |
| 9,322,951 | B2* | 4/2016 | Herzig | G01W 1/10 |
| 9,606,168 | B2* | 3/2017 | Kerrigan | H02J 13/0062 |
| | | | | 13/62 |
| 9,686,122 | B2* | 6/2017 | Herzig | H04L 41/026 |
| 9,830,660 | B2* | 11/2017 | Dintenfass | G16H 50/30 |
| 10,019,760 | B2* | 7/2018 | Dintenfass | G06Q 40/00 |
| 10,032,223 | B2* | 7/2018 | Wadley | G06Q 40/06 |
| 10,049,406 | B2* | 8/2018 | Nicholson | G06Q 50/01 |
| 10,121,200 | B1* | 11/2018 | Rapaport | G06Q 40/04 |
| 10,140,470 | B2* | 11/2018 | Kurian | H04L 9/3236 |
| 10,249,003 | B2* | 4/2019 | Nicholson | G06Q 50/01 |
| 10,262,372 | B2* | 4/2019 | Dintenfass | G06Q 40/00 |
| 10,339,603 | B1* | 7/2019 | Sandulli | G06Q 40/06 |
| 10,440,101 | B2* | 10/2019 | Kurian | G06Q 40/06 |
| 10,495,786 | B2* | 12/2019 | Herzig | H02J 3/004 |
| 10,508,987 | B2* | 12/2019 | Caine | H02S 50/15 |
| 10,564,315 | B2* | 2/2020 | Kerrigan | G01V 99/00 |
| 10,628,887 | B2* | 4/2020 | Wadley | G06Q 40/06 |
| 10,643,283 | B2* | 5/2020 | Nicholson | G06Q 50/01 |
| 10,728,083 | B2* | 7/2020 | Herzig | H04L 41/026 |
| 2009/0106140 | A1* | 4/2009 | De La Motte | G06Q 40/06 |
| | | | | 705/37 |
| 2014/0372279 | A1* | 12/2014 | Wagner | G06Q 40/04 |
| | | | | 705/37 |
| 2017/0011460 | A1 | 1/2017 | Molinari | |
| 2018/0091316 | A1* | 3/2018 | Stradling | G06Q 40/04 |
| 2019/0114334 | A1* | 4/2019 | Gunther | G06F 16/2358 |

FOREIGN PATENT DOCUMENTS

| | | | |
|---|---|---|---|
| WO | 2015133419 | A1 | 9/2015 |
| WO | 2017091530 | | 6/2017 |
| WO | 2017182788 | | 10/2017 |
| WO | 2018204541 | | 11/2018 |
| WO | 2018232297 | A1 | 12/2018 |

OTHER PUBLICATIONS

Aelbrecht, J. (2016). R3 working on smart contract templates. FOWeek, , n/a. Retrieved from https://dialog.proquest.com/professional/docview/1811256029?accountid=131444 on Aug. 21, 2020 (Year: 2016).*

Egelund-Müller, B., Elsman, M., Henglein, F., & Ross, O. (2017). Automated execution of financial contracts on blockchains. Business & Information Systems Engineering, 59(6), 457-467. doi:http://dx.doi.org/10.1007/s12599-017-0507-z on Aug. 21, 2020 (Year: 2017).*

"ISDA Legal Guidelines for Smart Derivatives Contracts: Introduction", copyright 2018 International Swaps and Derivatives Association, Inc., Jan. 2019, 24 pages.

Acheson, Noelle, "Blockchain and Capital Markets: Interest Rate Swaps", fintechblue, printed from <URL: http://www.fintechblue.com/2017/09/blockchain-and-capital-markets-interest-rate-swaps/>, Sep. 26, 2017, 10 pages.

Hyperledger Wiki—Use Case Interest Rate Swap, printed from <URL: https://wiki.hyperledger.org/requirements/use-cases/use-case-interest-rate-swap>, Nov. 2, 2016, 2 pages.

Krystle M, "Shinhan Bank Chooses a Blockchain for 'Interest Rate Swap' to Eliminate Risk of Human Error", printed from <URL: https://bitcoinexchangeguide.com/shinhan-bank-chooses-a-blockchain-for-interest-rate-swap-to-eliminate-risk-of-human-error/>, Dec. 10, 2018, 3 pages.

Starlander, Isak, "Counterparty Credit Risk on the Blockchain", Degree Project in Mathematics, Second Cycle, printed from <URL: https://www.math.kth.se/matstat/seminarier/reports/M-exjobb17/171013d.pdf>, Stockholm, Sweden, 2017, 68 pages.

International Search Report and Written Opinion of International Application No. PCT/US2020/017328 filed Feb. 7, 2020, dated Apr. 28, 2020, 7 pages.

* cited by examiner

FIG. 2

FRACTIONALIZED INTEREST RATE SWAPS

CROSS-REFERENCE TO RELATED APPLICATIONS

This application claims priority to U.S. Provisional Patent Application No. 62/802,269, filed Feb. 7, 2019, which is hereby incorporated by reference in its entirety.

FIELD OF THE INVENTION

The invention relates to a blockchain-based technology platform, including a decentralized application (dApp) and one or more smart contracts that enable an online, one-to-one or one-to-many, interest rate swaps marketplace with fractionalized interests.

BACKGROUND OF THE INVENTION

Due to technological and other limitations, the market for interest rate swaps is limited. For example, interest rate swaps currently are generally only available to institutions. Banks are reluctant to hold long fixed rate loans because they are highly regulated and are subject to "stress tests" by regulators to assess what effect changes in interest rates will have on the bank's reserves and liquidity. The bank regulators do not want regulated institutions to "bet the bank" by exposing the bank to the risk of loans earning at a low fixed rate of interest if interest rates paid to depositors climb in a rising interest rate environment. This would squeeze the net interest margin and diminish bank reserves. Regulators want asset and liabilities to have a rough "matching" of terms to avoid risk. This results in a strong incentive for banks to favor variable rate lending. This is one reason why banks offer adjustable rate mortgages (ARMs) or hybrid ARMs with a fixed rate for an initial period, converting to floating rate later.

Banks offer variable rate loans to both individuals and institutions that are priced off various bases, such as LIBOR (London Inter-Bank Offered Rate) or the prime rate. More recently, new base rates such as SONIA (Sterling Overnight Index Average) and SOFR (U.S. Secured Overnight Financing Rate) have been developed to supplant LIBOR for greater accuracy and reliability, but the changeover will not occur for several more years. Even then, there will still be many existing floating rate loans that are based on LIBOR terms.

For instance, a borrower might pay 200 basis points (2%) over LIBOR and the interest rate would be reset at various intervals called for in the loan term. Because some institutional borrowers (mainly corporations or municipal governments) would rather have certainty of their payments for budgeting purposes, banks or swap dealers will then sell interest rate swaps (at a markup over the wholesale swap rate) to an institutional borrower to convert the variable interest rate to a fixed rate of interest (or vice-versa) by agreeing to exchange cash flows in customized interest rate swap contracts.

The banks may then match up the offsetting risks, lay off the net risk at the wholesale rate, and keep the markup. This is a significant business for the major banks and swap dealers. It is one of the most liquid, efficient markets and the bid-ask spread is very tight. However, the swap contract rates offered to the borrower are based on the corporate yield curve rather than the government risk-free yield curve due to the need to trust the counterparty. Thus, there is room for borrowers to achieve cost savings in this market.

One of the problems with known systems for managing interest rate swaps is that it is not designed for fractionalized interest rate swaps—particularly in a way that minimizes risks to the parties. These and other technical limitations of existing systems are problems with existing systems for implementing interest rate swaps.

SUMMARY OF THE INVENTION

Various embodiments of the present disclosure include systems and methods that utilize a blockchain-based technology platform, including smart contracts and oracles, to enable an online, one-to-one or one-to-many, interest rate swaps marketplace with fractionalized interests. The invention comprises a technical solution that overcomes the technical problems of prior systems that manage interest rate swaps. The invention involves a novel extension of the concept of interest rate swaps that differs from existing structures for executing interest rate swaps. For example, unlike conventional mechanisms for executing interest rate swaps, escrow may be required to be held and managed by a smart contract to guarantee performance of the parties to pay any net loss incurred. The escrow requirement may ensure that the calculated payout at contract maturity is guaranteed to be paid by the autonomous smart contract on the blockchain. As such, the markup for credit risk swap yields may not be needed. This would enable corporations and municipalities to save substantial amounts on their interest rate swap contracts, as the interest income not earned on the escrow may be very small compared to the large savings on the credit risk markup. In the system described herein, net profit or loss in excess of the escrow held may be disregarded, and negative interest rates may be limited to zero. The extreme simplification of the interest rate swap into single cash flows for a one-month or other limited term in the future allows many individuals to participate who may be excluded from participating by conventional mechanisms for executing interest rate swaps. As such, the invention may result in a larger and more liquid interest rate swap market.

In various implementations, instead of one-to-one swaps between two major players, a blockchain-based smart contract would enable one-to-many swaps between institutions and many individual counterparties that are willing to accept the offsetting risk or certainty. This "fractionalizing" of the interest rate swap contract could be accomplished by a customizable smart contract. The smart contract could reduce the overall cost to the borrower for the interest rate protection and offer better investment returns to risk-bearing individuals by cutting intermediary costs.

An aspect of the invention relates to a system and method for processing and executing interest rate swaps between one or more counterparties using a distributed blockchain ledger, smart contracts, and oracles to enable parties to transact without needing a trusted third party or intermediary. The system may have a number of distributed ledger nodes, each of which may host a copy of the distributed ledger (or a portion of the ledger) and the one or more smart contracts that are coupled to an interest rate swap computer system (comprising a server, databases, and software). The interest rate swap computer system may be configured to facilitate the processing and execution of the interest rate swaps using the distributed ledger and the smart contract. Other technical configurations may be used. One or more oracles may be used to obtain interest rate and/or other information needed by the system. Users may use MetaMask (a browser extension that holds private keys for a wallet to allow interaction with applications on the web3 decentralized internet) and/or a similar blockchain-enabled browser extension to interact with the system and/or components thereof. In various implementations, the interest rate swap computer system may comprise a website through which parties interact to transact as set forth herein.

The system may include a decentralized application (or "dApp"), configured to implement some or all of the functions described herein. The dApp and the smart contracts may be implemented on an Ethereum Virtual Machine (EVM), a web3 decentralized internet system, an Ethereum 2.0 (ETH2) based decentralized internet system, and/or one or more other decentralized internet systems now known or future developed.

In various implementations, the system may obtain the swap contract rate (i.e. the interest rate applicable to the fixed leg in the floating-for-fixed interest rate swap), and display it to the parties for final agreement on contract terms. dApp multi-signatures may form the smart contract agreement based on standard contract terms delineated in the front-end website and accepted by the user. In various implementations, the smart contract may be configured to hold an escrow, process the final floating interest rate value at maturity, compute the payments automatically on the maturity date, and pay each party. The contract may add security and remove the need for one party to trust the other because payment availability is assured by the EVM.

After a bid is entered (but before it is finalized) a chart of potential payback amounts may be generated by the system and displayed via a computer interface. The chart of potential payback amounts may assist a bidder to understand how the contract will behave as interest rates change. In some implementations, the system may require the buyer to acknowledge viewing and understanding of this information before final submission of the order. In some implementations, all of this would be calculated and displayed on the website for the user to consider before purchase. A warning alert may also be configured to emit if the user attempts to offer an obviously uneconomic swap.

According to another aspect of the invention, fractionalized swaps may be implemented. Fractionalized swaps may also be interchangeably referred to as fractionated swaps. Fractionalized swaps comprise mini versions of interest rate swaps that would be available to individuals in retail-oriented amounts. In some implementations, fractionalized swaps may also be available to institutional participants. Each fractionalized swap may convert a single variable monthly interest payment into a fixed one (or vice-versa) with an escrow posted by both parties to assure payment. Fractionalized swaps can open up interest rate swaps to the masses and also bring down the cost for institutions. The technology platform described herein may enable this new functionality. In some implementations, the functionality of the technology platform described herein may also enable fiat cross-currency future swaps, crypto cross-currency future swaps, fiat cross-currency interest swaps, crypto cross-currency interest swaps, and/or one or more other types of rate swaps now known or future developed.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily drawn to scale.

FIG. 2 illustrates an example interface of an interest rate swap platform through which a user may input a set of input variables, in accordance with one or more implementations of the invention.

DESCRIPTION OF THE INVENTION

It will be appreciated by those having skill in the art that the implementations described herein may be practiced without these specific details or with an equivalent arrangement. In various instances, well-known structures and devices are shown in block diagram form to avoid unnecessarily obscuring the implementations.

Example System Architecture

Figure 1:
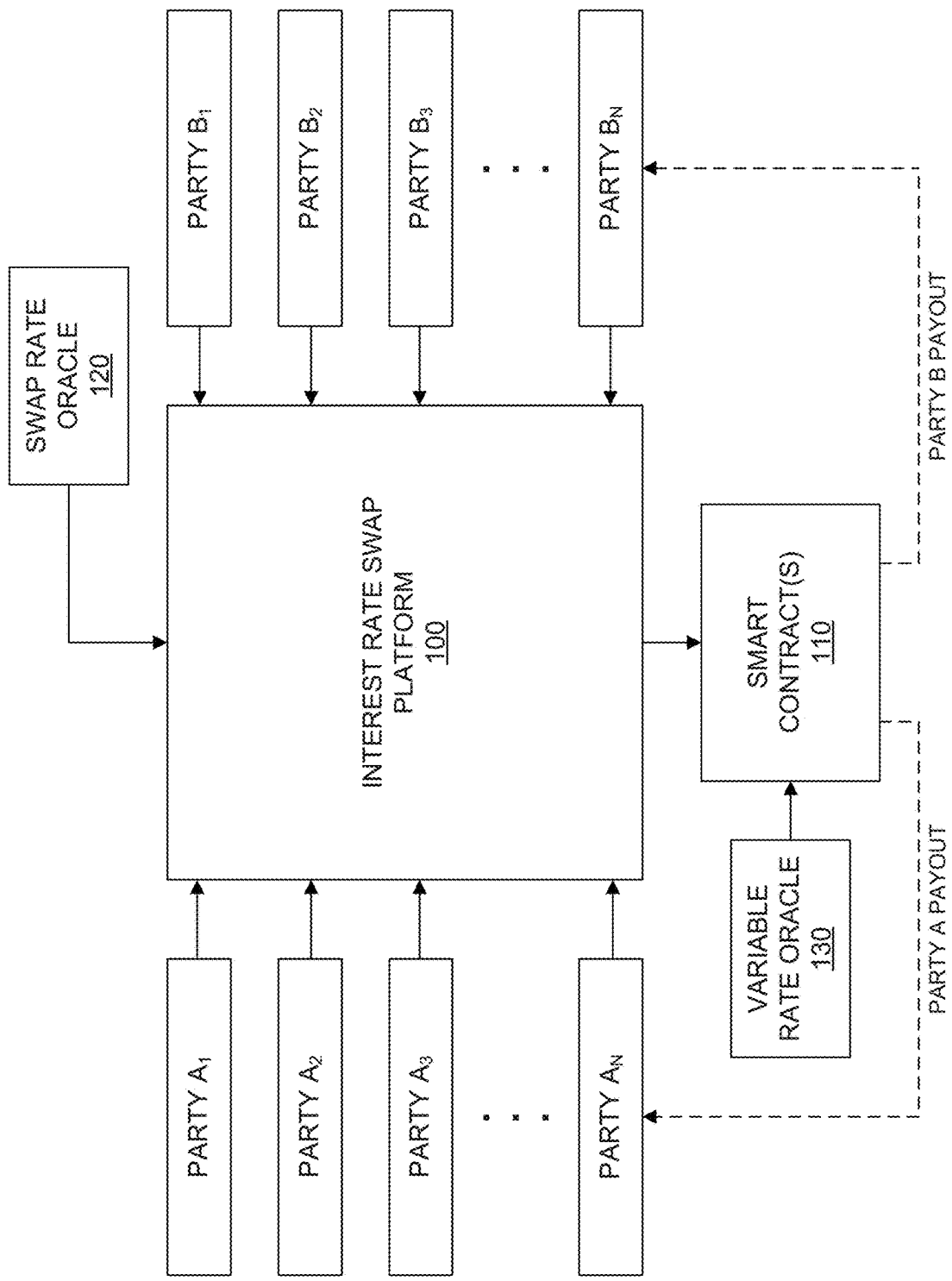
FIG. 1 illustrates a block diagram of an example of a system architecture comprising an interest rate swap platform, in accordance with one or more implementations of the invention.

FIG. 1 illustrates a block diagram of an example of a system architecture comprising interest rate swap platform 100, in accordance with one or more implementations of the invention. In various implementations, interest rate swap platform 100 may comprise a distributed ledger-based platform. In various implementations, interest rate swap platform 100 may comprise a server programmed to implement the functionality described herein. For example, interest rate swaps platform 100 may include one or more physical processors, one or more storage devices (which may be configured to store one or more databases), and/or other components. The one or more physical processors may be configured to provide information processing capabilities in interest rate swaps platform 100. As such, the one or more physical processors may comprise one or more of a digital processor, an analog processor, a digital circuit designed to process information, a central processing unit, a graphics processing unit, a microcontroller, an analog circuit designed to process information, a state machine, and/or other mechanisms for electronically processing information.

In various implementations, the one or more physical processors may be configured to execute one or more computer readable instructions. Executing the computer readable instructions may cause the one or more physical processors to facilitate the interest rate swaps platform 100 described herein for processing and executing interest rate swaps between one or more counterparties using a distributed blockchain ledger. The computer readable instructions may include one or more computer program components. In some implementations, the computer readable instructions may be stored in electronic storage. The computer readable instructions program the one or more physical processors (and therefore interest rate swaps platform 100) to perform the operations described herein.

In various implementations, interest rate swaps platform 100 may be accessed by various parties via a network. For example, the various parties may include one or more of a first type of party (e.g., Party $A_1$, Party $A_2$, Party $A_3$, . . . , and/or Party $A_N$), one or more of a second type of party (e.g., Party $B_1$, Party $B_2$, Party $B_3$, . . . , and/or Party $B_N$), and/or one or more other parties of various types. In various implementations, the one or more of the first type of party may comprise one or more borrowers, and the one or more of the second type of party may comprise one or more investors. In various implementations, a party may use a client device (including a computer comprising at least a processor, memory, and associated software) to access interest rate swaps platform 100. The parties may interact with the platform to engage in transactions as described herein.

In various implementations, the system may include one or more smart contracts 110, swap rate oracle 120, variable rate oracle 130, and/or one or more other smart contracts and/or oracles. In various implementations, the system may comprise a blockchain (or other distributed ledger technology) network with which interest rate swaps platform 100 may communicate to obtain and/or store data, among other things. As described herein, the blockchain may include one or more nodes. The one or more oracles may provide data, events, and/or other information to interest rate swap platform 100 and/or one or more smart contracts 110, which may comprise part of the blockchain network. For example, swap rate oracle 120 may be configured to interact with one or more external resources to obtain a swap rate needed for calculation of the price to make a swap equivalent at the outset to a buyer and seller (i.e., a borrower and investor), and variable rate oracle 130 may be configured to interact with one or more external resources to obtain a variable rate needed to facilitate a fractionalized interest rate swap as described herein. In various implementations, one or more smart contracts 110 may be configured to calculate a payment amount and facilitate payment of the calculated amount to the respective parties involved in a contract.

In various implementations, interest rate swaps platform 100 may be configured to query swap rate oracle 120, variable rate oracle 130, and/or one or more other oracles to obtain information from one or more external resources that is needed to perform the operations described herein. In various implementations, interest rate swaps platform 100 may be configured to query swap rate oracle 120 to obtain a market yield curve to derive the current swap rate based on the input variables specified by the user. In various implementations, a current variable rate for the interest rate index selected by the user may be required to calculate the amounts to be allocated to the borrower and investor at the maturity date of the fractionalized interest rate swap. Accordingly, interest rate swaps platform 100 may be configured to query variable rate oracle 130 to obtain the current variable rate for the interest rate index selected by the user at the maturity date of the fractionalized interest rate swap.

In various implementations, interest rate swaps platform 100 may comprise a blockchain-based technology platform that, with smart contracts and oracles, is configured to enable an online, one-to-one or one-to-many, interest rate swaps marketplace with fractionalized interests. The invention embodied by the interest rate swaps platform 100 comprises a technical solution that overcomes the technical problems of prior systems that manage interest rate swaps. Interest rate swaps are an exchange of cash flows where the interest payment amount computed at a fixed rate of interest is traded or swapped for an interest payment amount computed at a variable floating rate of interest. The net difference is paid to or received by the respective parties participating in the swap. Systems for trading interest rate swaps, in general, are known. For example, systems for trading interest rate swaps are disclosed in both U.S. Pat. No. 6,304,858 and WIPO publication WO 2018/204541 A1, the contents of which are both herein incorporated by reference in their entirety.

The invention, however, involves a novel extension of the concept of interest rate swaps that differs from existing structures for executing interest rate swaps. For example, unlike conventional mechanisms for executing interest rate swaps, escrow may be required to be held and managed by a smart contract to guarantee performance of the parties to pay any net loss incurred. The escrow requirement may ensure that the calculated payout at contract maturity is guaranteed to be paid by the autonomous smart contract on the blockchain. As such, the markup for credit risk swap yields may not be needed. This would enable corporations and municipalities to save substantial amounts on their interest rate swap contracts, as the interest income not earned on the escrow may be very small compared to the large savings on the credit risk markup. In this system described herein, net profit or loss in excess of the escrow held may be disregarded, and negative interest rates may be limited to zero. The extreme simplification of the interest rate swap into single cash flows for a one-month or other limited term in the future allows many individuals to participate who may be excluded from participating by conventional mechanisms for executing interest rate swaps. As such, the invention may result in a larger and more liquid interest rate swap market.

In various implementations, instead of one-to-one swaps between two major players, a blockchain-based smart contract would enable one-to-many swaps between institutions and many individual counterparties that are willing to accept the offsetting risk or certainty. This "fractionalizing" of the interest rate swap contract could be accomplished by a customizable smart contract. The smart contract could reduce the overall cost to the borrower for the interest rate protection and offer better investment returns to risk-bearing individuals by cutting intermediary costs.

In various implementations, interest rate swaps platform 100 may be configured to process and execute interest rate swaps between one or more counterparties using a distributed blockchain ledger, smart contracts, and oracles to enable parties to transact without needing a trusted third party or intermediary. In various implementations, interest rate swaps platform 100 may be configured to communicate with a number (or set) of distributed ledger nodes, each of which may host a copy of the distributed ledger (or a portion of the ledger) and the one or more smart contracts that are coupled to interest rate swaps platform 100. In various implementations, interest rate swaps platform 100 may be configured to facilitate the processing and execution of the interest rate swaps using the distributed ledger and the smart contract. Other technical configurations may be used. In various implementations, one or more oracles may be used to obtain interest rate and/or other information needed by the system. In some implementations, users may utilize Meta-Mask—a browser extension that holds private keys for a wallet to allow interaction with applications on the web3 decentralized internet—and/or a similar blockchain-enabled browser extension to interact with interest rate swaps platform 100 and/or other components described herein. In various implementations, interest rate swaps platform 100 may comprise a website through which parties interact to transact as set forth herein.

In various implementations, a decentralized application (or "dApp") may be configured to implement some or all of the functions described herein. The dApp and the smart contracts may be implemented on an Ethereum Virtual Machine (EVM), a web3 decentralized internet system, an Ethereum 2.0 (ETH2) based decentralized internet system, and/or one or more other decentralized internet systems now known or future developed.

In various implementations, interest rate swaps platform 100 may be configured to generate one or more user interfaces configured to provide access to interest rate swaps platform 100. The one or more user interfaces may include one or more user input components configured to receive user input. For example, the one or more user interfaces may include at least one or more user input components configured to receive user input indicating a set of input variables. In various implementations, interest rate swaps platform 100 may be configured to cause the one or more interfaces to be presented via a display of a user device of a user providing/selecting the set of input variables. For example, a front-end website may be configured to present a user interface through which a party may enter various information to initiate a transaction. By way of example, the following may comprise one or more input variables that may be captured through user input via the user interface:

- (i) Notional amount (i.e., the principal amount that the interest rate applies to)
- (ii) Escrow amount chosen—the higher the amount the more secure and attractive it appears to the counterparty but also the more it cuts into the party's own potential return
- (iii) Interest rate index (e.g., Libor, Eurolibor, SONIA-Sterling Overnight Index Average, SOFR-Secured Overnight Financing Rate, Ameribor, US Treasury Constant Maturity, prime rate, other risk-free reference rates, etc.)
- (iv) Floater margin over index rate in basis points
- (v) Beginning date of contract
- (vi) Maturity date
- (vii) An interest rate on a current loan
- (viii) Information on message sender and address obtained from registration and login
- (ix) Ether (ETH), ERC (Ethereum Request for Comments) token, or similar account address to pay escrow and to receive payout
- (x) Current user rate-type (or an indication of whether the user wishes to switch to fixed or floating)
- (xi) Choice of terms and conditions if customized contract terms are desired
- (xii) Length of measurement period (usually one month)

The input variables entered from the foregoing may comprise the set of input variables that define a fractionalized interest rate swap. In various implementations, interest rate swaps platform 100 may be configured to require a user to provide at least one or more input variables. For example, interest rate swaps platform 100 may be configured to require a user to provide at least a notional amount of a loan principal for which a user would like to swap interest on, the annual percentage rate of interest a user is currently required to pay, the rate type the user wishes to swap out of (e.g., from fixed into variable or from variable into fixed), and/or one or more other input variables.

Figure 2:
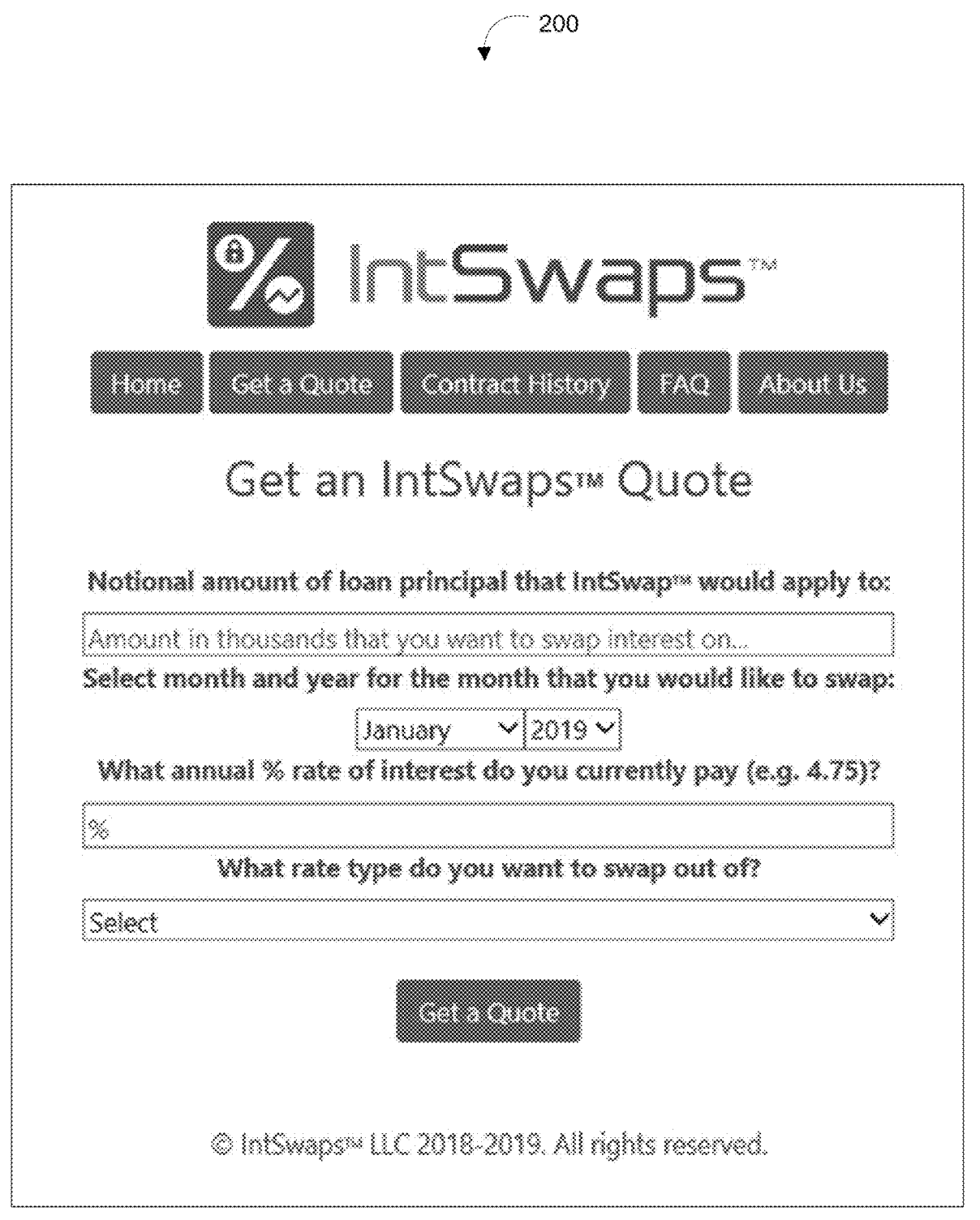

FIG. 2 illustrates an example interface 200 of an interest rate swap platform through which a user may input a set of input variables, in accordance with one or more implementations of the invention. In various implementations, interest rate swaps platform 100 may be configured to generate a user interface the same or similar to example interface 200. In various implementations, example interface 200 may include a set of input components configured to receive user input indicating a set of input variables. For example, example interface 200 may include a set of input components configured to receive user input indicating a set of input variables for a fractionalized (or other) interest rate swap. In example interface 200, the set of input components include input components configured to receive a notional amount of loan principal for which a user would like to swap interest on, the period in which the user would like to swap interest for, the annual percentage rate of interest a user is currently required to pay, and the rate type the user wishes to swap out of (e.g., from fixed into variable or from variable into fixed). In some implementations, a user may required to provide input variables for each of the input components depicted on example interface 200 before progressing. After inputting the input variables on example interface, a user may select a selectable component that causes the user to receive a quote. For example, upon selection of a selectable component on example interface 200, interest rate swaps platform 100 may be configured to cause an interface to appear through which a chart of potential payback amounts may be provided to assist a bidder to understand how the contract will behave as interest rates change (e.g., example interface 300).

In some implementations, interest rate swaps platform 100 may be configured to issue a warning if an escrow amount chosen is too high for a swap to be profitable (since the escrow earns no interest other than natural inflation in the value of ETH or other token of value placed in escrow). For example, at least one of the set of input variables received may comprise a proposed escrow amount. In various implementations, interest rate swaps platform 100 may be configured to calculate a threshold value at which the interest rate swap is not profitable based on the set of input variables. For example, interest rate swaps platform 100 may be configured to calculate a threshold value at which the interest rate swap is not profitable based on a proposed escrow amount. In various implementations, interest rate swaps platform 100 may be configured to determine whether the proposed escrow amount exceeds the threshold value. Responsive to a determination that the proposed escrow amount exceeds the threshold value, interest rate swaps platform 100 may be configured to cause a notification to be displayed via the user interface. In some implementations, the notification may comprise a warning that the proposed escrow amount is too high for the interest rate swap to be profitable.

In various implementations, interest rate swaps platform 100 may be configured to obtain the swap contract rate (i.e., the interest rate applicable to the fixed leg in the floating-for-fixed interest rate swap), and display it to the parties for final agreement on contract terms. In some implementations, dApp multi-signatures may form the smart contract agreement based on standard contract terms delineated in the front-end website and accepted by the user. In various implementations, one or more smart contracts may be configured to hold an escrow, process the final floating interest rate value at maturity, compute the payments automatically on the maturity date, and process payments to each party. In some implementations, the contract may add security and remove the need for one party to trust the other because payment availability is assured by the EVM.

In various implementations, interest rate swaps platform 100 may be configured to generate a chart of potential payback amounts after a bid is entered (but before it is finalized) and display the chart via a computer interface. The chart of potential payback amounts may assist a bidder to understand how the contract will behave as interest rates change. In some implementations, interest rate swaps platform 100 may be configured to require the buyer to acknowledge viewing and understanding of this information before final submission of the order. In some implementations, all of this would be calculated and displayed on the website for the user to consider before purchase. A warning alert may also be configured to emit if the user attempts to offer an obviously uneconomic swap.

Figure 3:
FIG. 3 illustrates an example interface of an interest rate swap platform through which a chart of potential payback amounts may be provided to assist a bidder to understand how the contract will behave as interest rates change, in accordance with one or more implementations of the invention.

FIG. 3 illustrates an example interface 300 of an interest rate swap platform through which a chart of potential payback amounts may be provided to assist a bidder to understand how the contract will behave as interest rates change, in accordance with one or more implementations of the invention. In various implementations, interest rate swaps platform 100 may be configured to generate a user interface the same or similar to example interface 300. In various implementations, interest rate swaps platform 100 may be configured to generate example interface 300 based on input variables provided through a separate interface (e.g., example interface 200). For example, a user may provide user input in an interface indicating a notional amount of $100,000, a period of one month (e.g., March 2022), a current annual interest rate of 4.0%, a desire to swap from fixed into variable (or from variable into fixed), and/or one or more other input variables. Based on the input variables submitted, interest rate swaps platform 100 may be configured to generate a chart of potential payback amounts to assist a bidder to understand how the contract will behave as interest rates change, as depicted in example interface 300. In various implementations, interest rate swaps platform 100 may be configured to enable a user to buy an interest rate swap contract via example interface 300. For example, example interface 300 may include one or more input components through which a user may indicate a request to purchase an interest rate swap contract. In some implementations, example 300 may include text (or a link to an interface comprising text) indicating one or more terms, conditions, and/or other information related to the quoted interest rate swap generated based on the input variables provided. In some implementations, interest rate swaps platform 100 may be configured to require a user to acknowledge that the user understands and/or agrees to the terms, conditions, and/or other information related to the quoted interest rate swap before allowing the user to purchase the interest rate swap via interest rate swaps platform 100.

In operation, a first party may expose a bid on the website and see if there are any takers. The first party may set a time and/or range limit on the bid or make it a market order at the market swap rate when the order is matched with a counterparty. Alternatively, interest rate swaps platform 100 may be configured to selectively take the opposite side of the trade to offer instant execution, and the net risk exposure could be absorbed by the platform operator or hedged out in the institutional swaps market.

In various implementations, interest rate swaps platform 100 may be configured to generate one or more webpages that enable the various features described herein. In some implementations, the one or more webpages may be accessible via the front-end website described herein. In some implementations, at least one of the one or more webpages may be configured to display an inventory of outstanding open bids and/or offers and will be searchable by maturity date, fixed vs. floating, escrow amount, and/or other factors. In some implementations, at least one of the one or more webpages may be configured to display some or all of the contracts that a party has entered into that are still outstanding, expired bids, and matured contracts. In some implementations, at least one of the one or more webpages may be configured to offer the capability to resell a previously-bought swap at the current swap rate for a party that wants to liquidate before maturity. In some implementations, a termination penalty may be calculated to compensate the counterparty for the early call. In various implementations, the front-end website and/or the one or more webpages may be configured to have a connection to live financial market data feeds for up-to-date market swap rates (e.g., via communication with swap rate oracle 120). In some implementations, one or more oracles may be used in conjunction with or to implement data feeds.

According to another aspect of the invention, interest rate swaps platform 100 may be configured to implement fractionalized swaps. Fractionalized swaps may also be interchangeably referred to as fractionated swaps. Fractionalized swaps comprise mini versions of interest rate swaps that would be available to individuals in retail-oriented amounts. In some implementations, interest rate swaps platform 100 may be configured to make fractionalized swaps available to institutional participants. Each fractionalized swap may convert a single variable monthly interest payment into a fixed one (or vice-versa) with an escrow posted by both parties to assure payment. Fractionalized swaps can open up interest rate swaps to the masses and also bring down the cost for institutions.

There is a universal need for risk management that can be implemented with interest rate swaps. In various implementations, interest rate swaps platform 100 may be configured to enable various types of interest rate instruments to be subject to the swaps of the invention. To further explain, the interest rate swap contract can be a complex legal and financial document with multiple cash flows, leverage points, reset intervals, indices, business day definitions, multiple payment terms, notification requirements (European vs American style settlement), choice of legal jurisdiction, reliance on standard master agreements, and/or other factors/aspects. In various implementations, interest rate swaps platform 100 may be configured to radically simplify this and use each cash flow as a separate component to be hedged as a fractionalized swap, rather than combining all cash flows into one complex swap. These separate cash flows can then be fractionalized into small notional amounts attractive to individual investors by the institution wanting to participate in the fractionalized swaps market.

According to one implementation, interest rate swaps platform 100 may be configured to enable both the borrower and investor to post Ether (ETH) or other items of value in escrow in the contract in equal amounts since the expected payment is zero at the beginning. In some implementations, a smart contract may be configured such that at the end of the term, the smart contract will process the published index interest rate from a reputable source, oracle, or data feed and settle the contract automatically by dividing the escrow between the two parties net of their calculated payout or refund due. The swap rate is needed for calculation of the price to make the swap equivalent on day one to the buyer and seller. In various implementations, the published index interest rate at the beginning of the measurement period (usually one month) is needed for calculation of the payout. A utility token, ETH, or fiat currency could be used to pay for the transaction service charge. Various other implementations will be apparent.

Normal interest rate swaps are between parties that know and trust each other—major financial institutions and corporations or governmental units. Interest rate futures have the futures exchange standing behind the contract to assure payment. Due to the technological implementation of the invention, the parties in the swaps implemented by the system of the invention need not know each other. The system is designed to ensure that the parties do not need to know or trust the counterparty. For example, both the buyer and seller may post ETH to escrow in equal amounts and the payout at the end of the swap term (referred to as tenor) would be determined by the ending values of the contract for each party. According to one aspect of the invention, the most that a buyer or seller could earn or pay would be 100% of their escrow. For someone who is a buy and hold investor in ETH, it would be a way to earn profits while holding, since ETH pays no interest unless you loan it out as a margin loan.

In some implementations, interest rate swaps platform 100 may be configured to establish an escrow amount based on the notional amount, floating index, contract length, and/or selected index. Based on a review of the variability in one-month USD LIBOR for the past thirty years, an escrow of 0.2% of the notional value would be sufficient to cover the entire payout owed in about 90% of cases for contract maturities of 24 months. The range of escrow amounts can vary and would increase with the length of the contract.

The limit of +/−100% payout would actually be a benefit from a regulatory perspective since it would serve as "rails" on the potential payout or loss. In most futures contracts, a party can lose many times more than what they invest. Here the payout may just be the net differential in interest payments and not the notional amount itself and any loss may be limited to the amount invested.

The invention described herein provides many benefits to individuals. The average individual currently has no effective way to hedge their interest rate risk in a simple, effective, and inexpensive manner. Homeowners in adjustable rate mortgages (ARMs) would effectively be able to switch into a fixed rate without refinancing costs. Homeowners unable to refinance due to underwriting standards (such as required percentage of owner-occupied condo units in a condominium building) would be able to obtain relief through interest rate swaps.

The invention described herein also provides many benefits to institutions. Interest rate swap contracts are one of the most liquid markets in the world at the institutional level with tight bid-ask spreads. However, the swap contract rate is based off the corporate rate of interest due to counter-party risk. It is believed that bringing the decentralized trust of the Ethereum Virtual Machine (EVM) to this market would allow the swap yield curve applicable to corporate borrowers to move closer to the government yield curve. Institutional borrowers would also be attracted to the transparency of swaps on an agent basis at wholesale swap contract rates rather than an opaque dealer markup on a principal basis.

The invention described herein addresses various trust and/or transparency issues that are present with prior swaps platforms. As described above, complex interest rate swaps currently take place between parties that know and trust each other or are handled by exchanges that stand behind the contract and hold margin account deposits to secure performance by the various parties. If the margin requirements are violated, the position is liquidated. However, even with regulated exchanges and dealers standing behind the contracts, risk exists. MF Global (a futures broker/dealer) failed in 2011 with $1.5 billion in customer funds unaccounted for. An advantage of the present system is that no one has to trust anyone. The parties may not know or care who is on the other side of the trade or whether they are trustworthy because the payout is held in escrow in the Turing-complete smart contract. In various implementations, interest rate swaps platform 100 leverages the immutability and trust system of the Ethereum Virtual Machine (EVM) to lower the cost of credit and increase flexibility.

However, interest rate swaps platform 100 is not necessarily dependent on the user having Ether account keys in a MetaMask browser or other method of crypto asset payment. In some implementations, interest rate swaps platform 100 may be implemented using strictly fiat US dollars which are converted to ETH, ERC tokens, or other tokens (such as stable coins) on a party's behalf. The transaction/conversion may be written to the blockchain and then reconverted back to USD at contract maturity. This would make it easier for the average homeowner to participate without understanding how to use MetaMask.

The dApp may use an oracle for the swap rate and other data (e.g., for Libor and/or other reference rate on the first day of the contract maturity month) instead of it being entered by the administrator or other individual. Escrow amounts could be increased to cover the full payout for 100% of the cases of variability in the past if so desired. Parties may sign in to their MetaMask (or other) wallet in their browser and then pay by inserting their wallet address on the screen. For security reasons, it may be desirable for parties to be required to withdraw funds at the end of the term, rather than the payout being sent to them automatically.

As described herein, systems and methods for implementing and managing one-to-many fractionalized interest rate swaps between a borrower and one or more investors via a distributed ledger-based platform (i.e., interest rate swaps platform 100) are disclosed. In some implementations, interest rate swaps platform 100 may be configured to enable users to set payoff at a higher percentage or multiple of calculated interest swap rate differential, such as 150% of calculated swap payment (to increase risk and potential reward). In some implementations, interest rate swaps platform 100 may be configured to enable users to set payoff at a lower percentage of the calculated interest rate swap differential, such as 80% of the payout, to reduce upfront escrow requirement or to reduce risk amount of payment owed if interest rates move against them. For example, a homeowner may choose to swap out only a portion of the interest payment due. In some implementations, interest rate swaps platform 100 may be configured to create a bid or offer of a fractionalized interest rate swap contract based on input variables provided by a user. In various implementations, interest rate swaps platform 100 may be configured to match bids and offers to create a fractionalized interest rate swap contract between bid and offer for swap of interest rates.

In various implementations, interest rate swaps platform 100 may be configured to create multiple interest rate swap offers at the same time for a bond or note with cash flows by inputting gross cash flows for interest and principal payments and then automatically fractionalizing it and assigning escrow values based on a user-selected and/or user-inputted percentage of payoff (i.e., 100% of calculated payout, less than 100% of calculated payout, or more than 100% of calculated payout), contract size, index, current rate, probability that escrow will cover 100% of potential payoff, and/or other input variables. In various implementations, interest rate swaps platform 100 may be configured to calculate and display probability that escrow amount will cover 100% of potential payout or X % of potential payout for Y % of the time. In some implementations, interest rate swaps platform 100 may be configured to create a bid or offer of fiat cross-currency future swaps (i.e., an exchange of foreign currencies in the future based on how exchange rates have moved versus what was expected). In some implementations, interest rate swaps platform 100 may be configured to create a bid or offer of crypto cross-currency future swaps (i.e., an exchange of crypto currencies in the future based on how exchange rates have moved versus what was expected). In some implementations, interest rate swaps platform 100 may be configured to create a bid or offer of fiat cross-currency interest swaps (i.e., interest owed in a foreign currency). In some implementations, interest rate swaps platform 100 may be configured to create a bid or offer of crypto cross-currency interest swaps (i.e., interest owed in a different crypto currency). In various implementations, interest rate swaps platform 100 may be configured to create bids or offers as described above in response to user input indicating a set of input variables. Based on the set of input variables, interest rate swaps platform 100 may be configured to generate a bid or offer and match another bid/offer prior to automatically configuring a customizable smart contract to initialize and process the interest rate swap based on the agreed upon set of input variables.

In various implementations, interest rate swaps platform 100 may be configured to utilize the smart contract for the interest rate swap to hold an escrow account associated with the interest rate swap. In other implementations, interest rate swaps platform 100 may be configured to utilize an escrow agent (instead of or in addition to the smart contract) to hold an escrow account associated with the interest rate swap.

Example Flowchart of Processes

Figure 4:
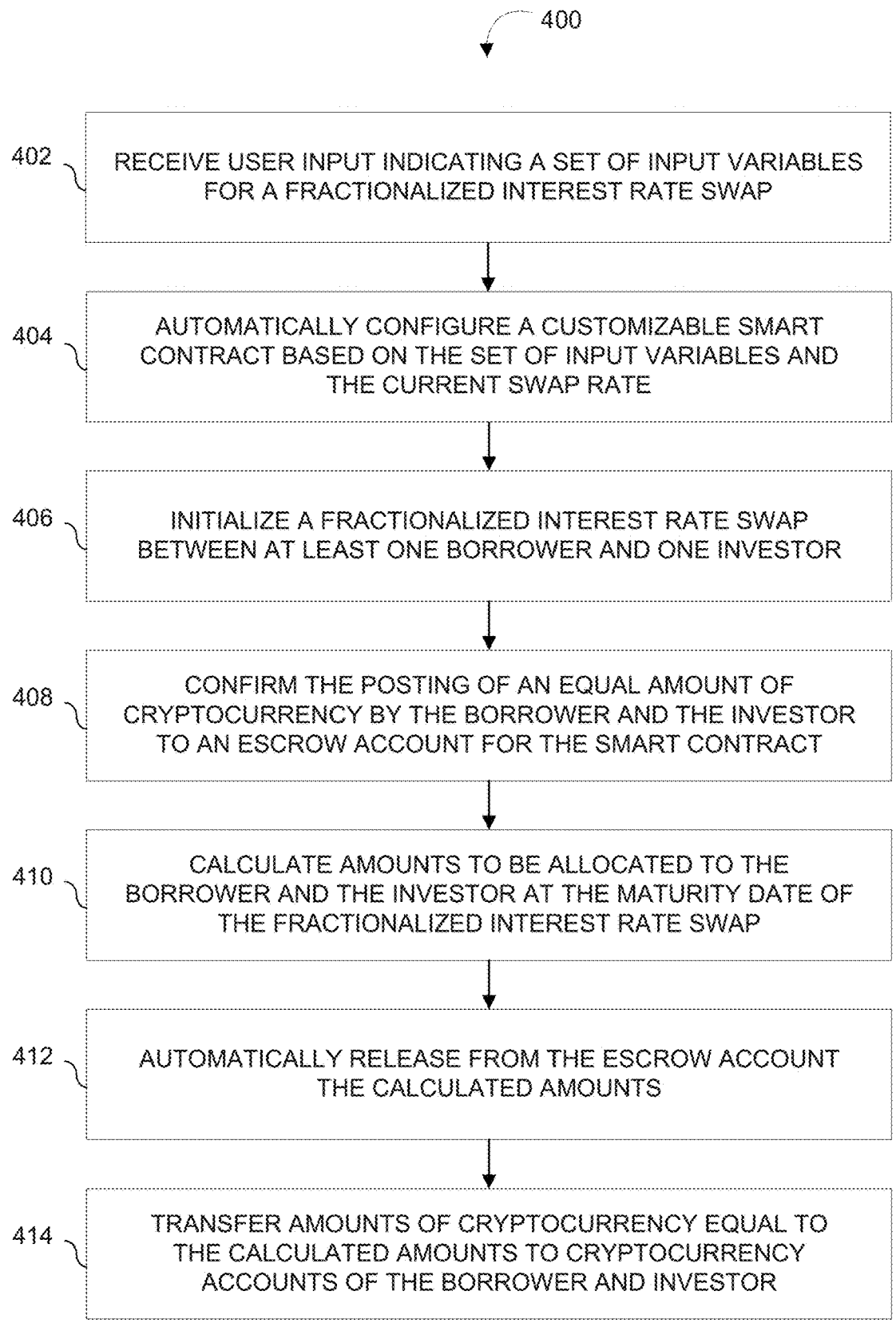
FIG. 4 illustrates an example of a process of implementing and managing one-to-many fractionalized interest rate swaps between a borrower and one or more investors via a distributed ledger-based platform, in accordance with one or more implementations of the invention.

FIG. 4 illustrates an example of a process 400 of implementing and managing one-to-many fractionalized interest rate swaps between a borrower and one or more investors via a distributed ledger-based platform, in accordance with one or more implementations of the invention. The operations of process 400 presented below are intended to be illustrative and, as such, should not be viewed as limiting. In some implementations, process 400 may be accomplished with one or more additional operations not described, and/or without one or more of the operations discussed. In some implementations, two or more of the operations may occur substantially simultaneously. The described operations may be accomplished using some or all of the system components described in detail above.

In some implementations, process 400 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of process 400 in response to instructions stored electronically on one or more electronic storage mediums. The one or more processing devices may include one or more devices configured through hardware, firmware, and/or software to be specifically designed for execution of one or more of the operations of process 400. In various implementations, each of the operations of process 400 may be implemented by one or more processors configured to implement a distributed ledger-based platform, as described herein. For example, each of the operations of process 400 may be implemented by one or more components of interest rate swaps platform 100 described herein.

In an operation 402, process 400 may include receiving user input indicating a set of input variables for a fractionalized interest rate swap. For example, the set of input variables may include a user selection of (i) a notional amount of a principal amount to which an interest rate applies, (ii) a proposed escrow amount, (iii) an interest rate index, (iv) a floater margin over the interest rate index, (v) a beginning date for the fractionalized interest rate swap contract, (vi) a maturity date for the fractionalized interest rate swap contract, (vii) an interest rate on a current loan, (viii) a cryptocurrency account address, and/or one or more other input components. In various implementations, the user input may be received via one or more user input components of a user interface. For example, one or more user interfaces may be generated that are configured to provide access to the distributed ledger-based platform. In various implementations, at least one of the user interfaces may include one or more user input components configured to receive the user input indicating the set of input variables. In various implementations, the user interface comprising the one or more user input components may be displayed via a display of a user device of a user providing/selecting the set of input variables.

In an operation 404, process 400 may include automatically configuring a customizable smart contract based on the set of input variables and a swap rate. In various implementations, a swap rate derived from a market yield curve based on the set of input variables may be obtained. For example, an oracle may be queried for a market yield curve to derive the current swap rate based on the input variables specified by the user. The smart contract may comprise computer code configured to implement a fractionalized interest rate swap based on the set of input variables. For example, the smart contract computer code may be programmed to include a set of settlement rules based on the set of input variables. In various implementations, the smart contract may be stored in a storage device configured to store the smart contract. In various implementations, the smart contract configured based on the set of input variables may include computer code that, when executed by one or more processors, causes the one or more processors to execute the operations described in operation 406, operation 408, operation 410, operation 412, and/or other operations described herein.

In an operation 406, process 400 may include initializing the fractionalized interest rate swap between at least a borrower and an investor based on a fractionalized interest rate swap contract defined by the set of input variables and the swap rate derived from the current market yield curve for the given set of input variables.

In an operation 408, process 400 may include confirming the posting of an equal amount of cryptocurrency by the borrower and the investor to an escrow account associated with the smart contract.

In an operation 410, process 400 may include calculating amounts to be allocated to the borrower and investor at the maturity date of the fractionalized interest rate swap. In various implementations, a first amount to be allocated to the borrower may be calculated based on the set of settlement rules, an amount posted to the escrow account by the borrower, and a value of the fractionalized interest rate swap for the borrower at a maturity date of the fractionalized interest rate swap contract. In various implementations, a second amount to be allocated to the investor may be calculated based on the set of settlement rules, an amount posted to the escrow account by the investor, and a value of the fractionalized interest rate swap for the investor at a maturity date of the fractionalized interest rate swap contract. The calculated first amount and the calculated second amount may comprise portions of the amount in the escrow account. In various implementations, a published index interest rate associated with the fractionalized interest rate swap at the maturity date of the fractionalized interest rate swap contract may be obtained and used to calculate the value of the fractionalized interest rate swap for the borrower and/or investor. For example, interest rate swaps platform 100 may be configured to interface with one or more oracles configured to obtain a published index interest rate and/or other information associated with a fractionalized interest rate swap (or other rate swap). In various implementations, the published index interest rate associated with the fractionalized interest rate swap may be required to calculate the value of the fractionalized interest rate swap for the borrower and/or investor. In various implementations, a current variable rate for the interest rate index selected by the user may be required to calculate the amounts to be allocated to the borrower and investor at the maturity date of the fractionalized interest rate swap. Accordingly, the current variable rate for the interest rate index selected by the user may be obtained at the maturity date of the fractionalized interest rate swap. For example, an oracle may be queried for the current variable rate for the interest rate index selected by the user that is needed to calculate the amounts to be allocated to the borrower and investor at the maturity date of the fractionalized interest rate swap.

In an operation 412, process 400 may include automatically releasing from the escrow account the calculated first amount and the calculated second amount.

In an operation 414, process 400 may include transferring amounts of cryptocurrency corresponding to the calculated first amount and the calculated second amount to cryptocurrency accounts of the borrower and investor, respectively. For example, amounts of cryptocurrency equal to the calculated first amount and the calculated second amount may be transferred to the cryptocurrency accounts of the borrower and investor, respectively.

The various processing operations and/or data flows depicted in FIG. 4 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Example Use Cases

In an example implementation, homeowners with a variable rate mortgage could hedge (i.e., protect from volatility) into a fixed rate (or vice-versa) for some or all of their future interest payments. There is high friction (meaning cost and effort to change) in getting a new mortgage with points, closing costs, recording fees, appraisal costs, time, effort, etc. Homeowners could convert their floating rate mortgage to a fixed rate one for some or all future interest payments through an interest rate swap without having to pay refinancing costs such as those previously listed. To hedge an entire 30-year mortgage of 360 monthly payments, a homeowner could enter into 360 fractional swaps to cover each mortgage interest payment. They could also choose to hedge just the early interest payments until the mortgage is substantially paid down. These input variables can be entered by the homeowner when they elect to create the one or more swaps.

In another example implementation, individual investors owning bond funds may utilize the system described herein. Individual investors owning bond funds may be exposed to interest rate risk. Interest rate swaps would enable them to hedge part of their interest rate exposure. For example, profits on interest rate swaps could partially offset the loss in market price on their bond funds when interest rates rise.

In another example implementation, banking institutions that want to manage the interest-rate sensitivity of their portfolios for bank stress testing may utilize the system described herein.

In another example implementation, cross-border individual borrowers may utilize the system described herein. Cross-border individual borrowers could hedge their interest rate and foreign currency risk this way with mini interest/forex swaps (also known as CIRCUS swaps for Combined Interest Rate and Currency Swap).

In another example implementation, investors/hedge funds that want to arbitrage (take advantage of price differentials) may utilize the system described herein.

In another example implementation, corporations and institutions that want to change the profile of their cash flows to manage risk may utilize the system described herein.

Virtually everyone that borrows, lends, or invests has interest rate risk of some sort. As such, virtually anyone may be incentivized to utilize the system described herein.

Blockchain Implementation

Blockchain technology can provide a technical solution with increased security and transactional efficiencies while reducing counterparty risk, the need for trust, compliance, and auditing costs. The blockchain network may include many nodes. A blockchain may comprise software that runs on a computer called a node. Each node may be connected to the blockchain network and can submit and receive transactions. Each node participating in the network may have its own copy of the blockchain ledger, which can be synchronized with other nodes using a peer-to-peer (or other) protocol. Each node may run the code to validate transactions and maintain the integrity of the blockchain.

Smart contracts are computer programs stored on a blockchain that facilitate, verify, or enforce the negotiation or performance of a contract, or that make a contractual clause unnecessary as contracts are automatically executed when pre-programmed conditions are satisfied. Smart contracts may also have a user interface and often emulate the logic of contractual clauses. Smart contracts eliminate ambiguity regarding the terms of agreements and reduce the reliance on external dependencies. Smart contract code may be written in Solidity or other language for use with an Ethereum Virtual Machine (EVM). This code may be stored and executed on the blockchain. Various alternatives may be used. Instead of smart contracts, chaincode may be used with the Hyperledger fabric. One or more smart contracts may be configured to implement the functionality described herein.

In various implementations, one or more smart contracts may be configured to depend on various conditions (e.g., a reference interest rate at a given date or time). To enhance the integrity of the system, an agreed-upon outside system or service, known as an "oracles," can be used to monitor and verify such conditions, data, and/or other events. The oracle may be an agreed to off-chain service (not part of the blockchain) that may send information to the one or more smart contracts.

To develop a smart contract, parts of the terms that make up a traditional contract are implemented in software code and uploaded to the blockchain, producing a decentralized smart contract that does not rely on a third party for recordkeeping or enforcement. Contractual clauses are automatically executed when pre-programmed conditions are satisfied. This eliminates ambiguity regarding the terms of the agreement and disagreement concerning the existence of external dependencies.

A blockchain is a form of distributed ledger. While various embodiments described herein reference a blockchain, other distributed ledgers can be used. According to some implementations, transactions between users or counterparties may be broadcast across the network, verified by one or more consensus or other algorithms and grouped together into blocks. Users may submit transactions using a client. This may be in the form of a cryptographic wallet or otherwise. As mentioned elsewhere herein MetaMask or other such tools may be used. When a block is full (based on a allocated amount of data, number of transactions or otherwise) a cryptographic hash of the block may be generated and written to the next block to thereby "chain" the blocks together and create an immutability of the transaction data. Each node on a network may maintain its own copy of the ledger and may be synchronized with other nodes, using various known techniques.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Communication media may comprise computer readable instructions, data structures, program modules and/or other components. Combinations of any of the above are also included within the scope of computer readable media.

In this description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using any single instruction, special purpose instructions, field programmable logic arrays, or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively.

For purposes of explanation, numerous specific details are set forth in order to provide a thorough understanding of the description. It will be appreciated by those having skill in the art that the implementations described herein may be practiced without these specific details or with an equivalent arrangement. Accordingly, it is to be understood that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The various instructions described herein are exemplary only. Other configurations and numbers of instructions may be used, so long as the processor(s) are programmed to perform the functions described herein. The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) may be programmed by one or more additional instructions that may perform some or all of the functionality attributed herein to one of the computer-readable instructions.

In some instances, well-known structures and devices are shown in block diagram form in order to avoid unnecessarily obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses, and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented system for implementing and managing one-to-many fractionalized interest rate swaps between a borrower and one or more investors via a blockchain network of computing nodes, the system comprising:
a first computing node of the computing nodes of the blockchain network, each computing node storing a respective at least a portion of a distributed ledger, the first computing node configured to communicate with and synchronize the respective at least a portion of the distributed ledger maintained at the first computing node with respect to each other computing node in the blockchain network using a peer-to-peer protocol, the first computing node comprising:
one or more processors; and
a storage device configured to store one or more computer program instructions that, when executed by the one or more processors, configure the one or more processors to:
receive user input indicating a set of input variables for a fractionalized interest rate swap, wherein the user input is received via one or more user input components of a user interface, and wherein the set of input variables comprises a desired payoff for the fractionalized interest rate swap specified, by a portion of the user input received via a corresponding user input component, as a percentage or multiple of an interest swap rate differential;
obtain a swap rate derived from a market yield curve based on the set of input variables;
automatically configure a customizable smart contract based on the set of input variables and the swap rate for distribution on the blockchain network, wherein automatically configuring the smart contract comprises pre-programming a set of settlement rules into the smart contract based on the set of input variables, wherein the smart contract comprises computer code that, when executed by the one or more processors, configures the one or more processors to:
initialize the fractionalized interest rate swap between at least the borrower and an investor based on a fractionalized interest rate swap contract defined by the set of input variables and the swap rate;
confirm the posting of an equal amount of cryptocurrency by the borrower and the investor to an escrow account associated with the smart contract;
automatically trigger execution of a portion of the computer code of the smart contract to initiate settlement operations responsive to one or more pre-programmed conditions in the smart contract being satisfied, wherein execution of the portion of the computer code of the smart contract configures the one or more processors to:
obtain a published index interest rate associated with the fractionalized interest rate swap at the maturity date of the fractionalized interest rate swap contract;
calculate a first amount to be allocated to the borrower based on the set of settlement rules, an amount posted to the escrow account by the borrower, and a value of the fractionalized interest rate swap for the borrower at a maturity date of the fractionalized interest rate swap contract determined based on the published index interest rate, the calculated first amount comprising a first portion of the escrow account;

calculate a second amount to be allocated to the investor based on the set of settlement rules, an amount posted to the escrow account by the investor, and a value of the fractionalized interest rate swap for the investor at the maturity date of the fractionalized interest rate swap contract determined based on the published index interest rate, the calculated second amount comprising a second portion of the escrow account;

automatically release from the escrow account the calculated first amount and the calculated second amount;

transfer a first amount of cryptocurrency corresponding to the calculated first amount to a cryptocurrency account address of the borrower; and transfer a second amount of cryptocurrency corresponding to the calculated second amount to a cryptocurrency account address of the investor.

2. The system of claim 1, wherein the set of input variables further includes at least one of a user selection of (i) a notional amount of a principal amount to which an interest rate applies, (ii) an interest rate index, (iii) a floater margin over the interest rate index, (iv) a beginning date for the fractionalized interest rate swap contract, (v) a maturity date for the fractionalized interest rate swap contract, (vi) an interest rate on a current loan, or (vii) a cryptocurrency account address.

3. The system of claim 1, wherein the one or more processors are further configured to:

generate one or more user interfaces configured to provide access to the blockchain network, the one or more user interfaces including the user interface comprising the one or more user input components configured to receive user input indicating the set of input variables; and cause at least the user interface comprising the one or more user input components to be displayed via a display of a user device.

4. The system of claim 1, wherein the storage device is configured to store the smart contract.

5. The system of claim 1, wherein to obtain the published index interest rate associated with the fractionalized interest rate swap, the smart contract is configured to interface with an oracle configured to obtain the published index interest rate.

6. The system of claim 1, wherein the user interface is a first user interface, and wherein the one or more processors are further configured to:

calculate potential payback amounts based on the set of input variables; and generate and display, via a second user interface, a chart of the potential payback amounts to assist a bidder to understand how the fractionalized interest rate swap will behave as interest rates change.

7. The system of claim 1, wherein the one or more computer program instructions form part of a decentralized application executable at each of the plurality of computing nodes of the blockchain network.

8. The system of claim 1, wherein the computer code of the smart contract, when executed by the one or more processors, further configures the one or more processors to:

convert funds from a fiat currency to the cryptocurrency prior to confirming the posting of the equal amount of the cryptocurrency by the borrower and the investor to the escrow account associated with the smart contract.

9. The system of claim 8, wherein the computer code of the smart contract, when executed by the one or more processors, further configures the one or more processors to:

convert the cryptocurrency back to the fiat currency in connection with releasing the calculated first amount and the calculated second amount from the escrow account.

10. A computer-implemented method of implementing and managing one-to-many fractionalized interest rate swaps between a borrower and one or more investors via a distributed ledger-based platform, the method comprising:

receiving, at a first computing node of a plurality of computing nodes of a blockchain network, user input indicating a set of input variables for a fractionalized interest rate swap, wherein the user input is received via one or more user input components of a user interface, wherein the set of input variables comprises a desired payoff for the fractionalized interest rate swap specified, by a portion of the user input received via a corresponding user input component, as a percentage or multiple of an interest swap rate differential, wherein each computing node of the blockchain network stores a respective at least a portion of a distributed ledger, wherein the first computing node is configured to communicate with and synchronize the respective at least a portion of the distributed ledger maintained at the first computing node with respect to each other computing node in the blockchain network using a peer-to-peer protocol, and wherein the first computing node comprises one or more processors and a storage device configured to store one or more computer program instructions that, when executed by the one or more processors, configure the one or more processors to perform the method;

obtaining a swap rate derived from a market yield curve based on the set of input variables;

automatically configuring a customizable smart contract based on the set of input variables and the swap rate for distribution on the blockchain network, wherein automatically configuring the smart contract comprises pre-programming a set of settlement rules into the smart contract based on the set of input variables, and wherein the smart contract comprises computer code including code representative of the pre-programmed settlement rules;

initializing, responsive to execution of the computer code of the smart contract by the one or more processors, the fractionalized interest rate swap between at least the borrower and an investor based on a fractionalized interest rate swap contract defined by the set of input variables and the swap rate;

confirming, responsive to execution of the computer code of the smart contract by the one or more processors, the posting of an equal amount of cryptocurrency by the borrower and the investor to an escrow account associated with the smart contract;

automatically triggering execution of a portion of the computer code of the smart contract to initiate settlement operations responsive to one or more pre-programmed conditions in the smart contract being satisfied;

obtaining, responsive to execution of the portion of the computer code of the smart contract by the one or more processors, a published index interest rate associated with the fractionalized interest rate swap at the maturity date of the fractionalized interest rate swap contract;

calculating, responsive to execution of the portion of the computer code of the smart contract by the one or more processors, a first amount to be allocated to the borrower based on the set of settlement rules, an amount posted to the escrow account by the borrower, and a value of the fractionalized interest rate swap for the borrower at a maturity date of the fractionalized interest rate swap contract determined based on the published index interest rate, the calculated first amount comprising a first portion of the escrow account;

calculating, responsive to execution of the portion of the computer code of the smart contract by the one or more processors, a second amount to be allocated to the investor based on the set of settlement rules, an amount posted to the escrow account by the investor, and a value of the fractionalized interest rate swap for the investor at the maturity date of the fractionalized interest rate swap contract determined based on the published index interest rate, the calculated second amount comprising a second portion of the escrow account;

automatically releasing, responsive to execution of the portion of the computer code of the smart contract by the one or more processors, from the escrow account the calculated first amount and the calculated second amount;

transferring, responsive to execution of the portion of the computer code of the smart contract by the one or more processors, a first amount of cryptocurrency corresponding to the calculated first amount to a cryptocurrency account address of the borrower; and transferring, responsive to execution of the portion of the computer code of the smart contract by the one or more processors, a second amount of cryptocurrency corresponding to the calculated second amount to a cryptocurrency account address of the investor.

11. The method of claim 10, wherein the set of input variables further includes at least one of a user selection of (i) a notional amount of a principal amount to which an interest rate applies, (ii) an interest rate index, (iii) a floater margin over the interest rate index, (iv) a beginning date for the fractionalized interest rate swap contract, (v) a maturity date for the fractionalized interest rate swap contract, (vi) an interest rate on a current loan, or (vii) a cryptocurrency account address.

12. The method of claim 10, the method further comprising:

generating, by the computer system, one or more user interfaces configured to provide access to the blockchain network, the one or more user interfaces including the user interface comprising the one or more user input components configured to receive user input indicating the set of input variables; and causing, by the computer system, at least the user interface comprising the one or more user input components to be displayed via a display of a user device.

13. The method of claim 10, the method further comprising:

storing, by the computer system, the smart contract in the storage device, wherein the storage device is configured to store the smart contract.

14. The method of claim 10, wherein obtaining the published index interest rate associated with the fractionalized interest rate swap by the smart contract comprises the smart contract interfacing with an oracle configured to obtain the published index interest rate.

15. The method of claim 10, wherein the user interface is a first user interface, the method further comprising:

calculating, by the computer system, potential payback amounts based on the set of input variables; and generating and displaying, by the computer system via a second user interface, a chart of the potential payback amounts to assist a bidder to understand how the fractionalized interest rate swap will behave as interest rates change.

16. The method of claim 10, wherein the one or more computer program instructions form part of a decentralized application executable at each of the plurality of computing nodes of the blockchain network.

17. The method of claim 10, further comprising converting, responsive to execution of the computer code of the smart contract by the one or more processors, funds from a fiat currency to the cryptocurrency prior to confirming the posting of the equal amount of the cryptocurrency by the borrower and the investor to the escrow account associated with the smart contract.

18. The method of claim 17, further comprising converting, responsive to execution of the computer code of the smart contract by the one or more processors, the cryptocurrency back to the fiat currency in connection with releasing the calculated first amount and the calculated second amount from the escrow account.

\* \* \* \* \*